March 28, 1939.    C. F. MOLZEN    2,151,931
INSULATOR
Filed Jan. 7, 1937    2 Sheets-Sheet 1
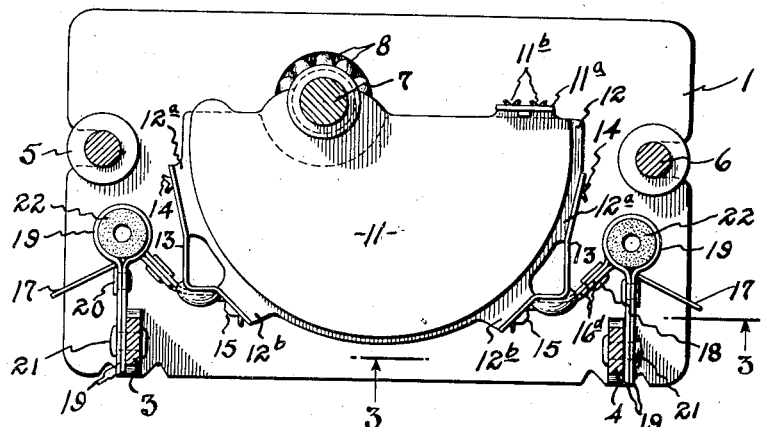
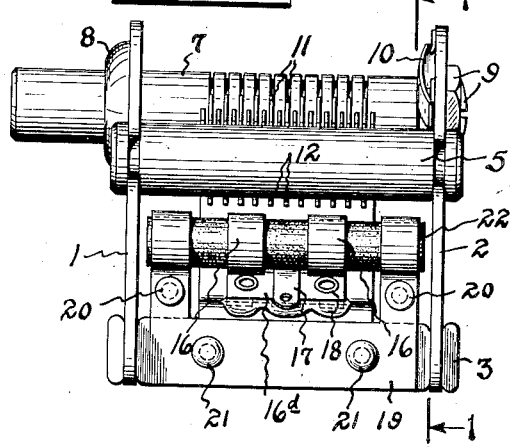    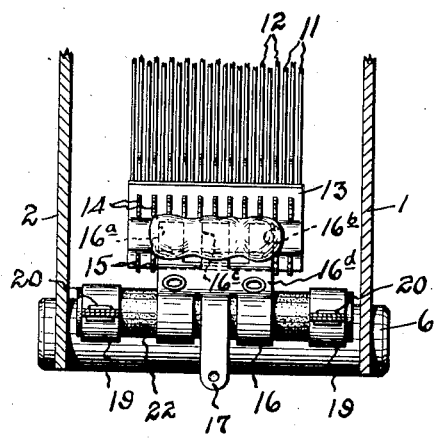
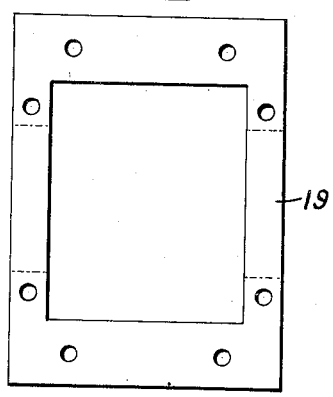    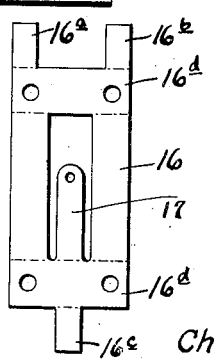
INVENTOR
Charles F. Molzen
BY Darby & Darby
ATTORNEYS March 28, 1939.  C. F. MOLZEN  2,151,931
INSULATOR
Filed Jan. 7, 1937   2 Sheets-Sheet 2
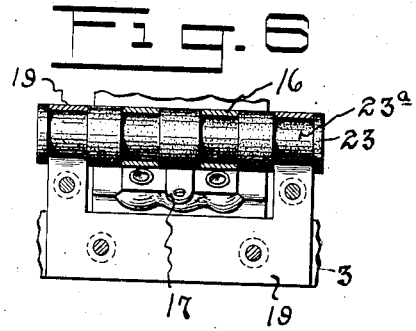
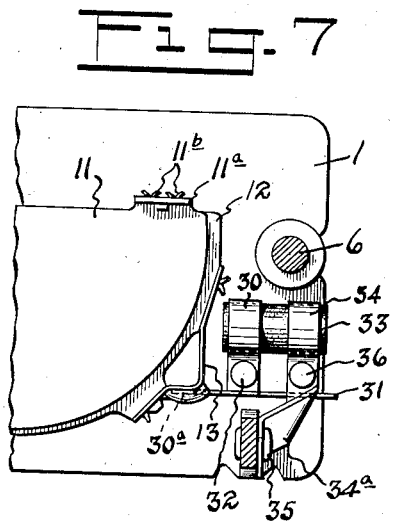
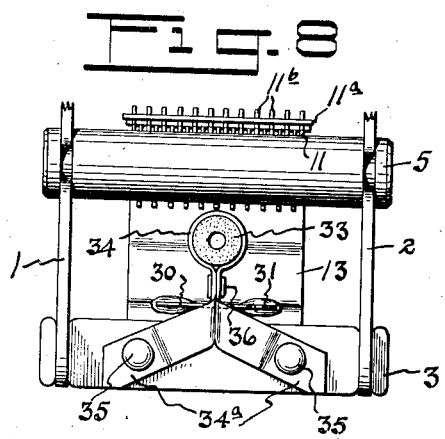
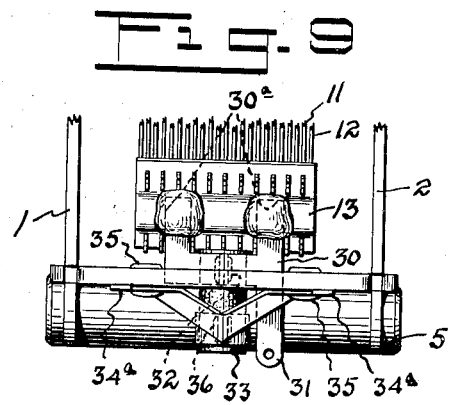
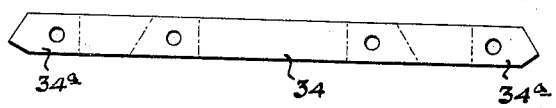
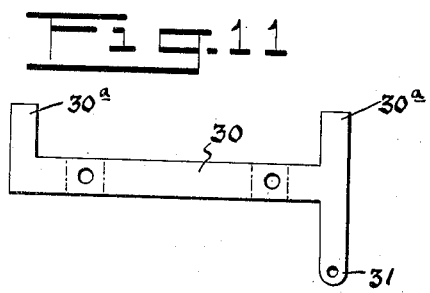
INVENTOR
Charles F. Molzen
BY Danby + Danby
ATTORNEYS Patented Mar. 28, 1939

2,151,931

UNITED STATES PATENT OFFICE 2,151,931

INSULATOR

Charles F. Molzen, Stratford, Conn., assignor to De Jur-Amsco Corporation, Shelton, Conn., a corporation of New York Application January 7, 1937, Serial No. 119,409

2 Claims. (Cl. 174—138)

This invention is concerned with electrical condensers, and more particularly with that part of the mechanical construction of condensers relating to means for supporting and insulating the stator plates from the rotor plates and supporting frame.

The general object of this invention is to provide, in a simple, commercial and practical form, a means of supporting the stator plates from the insulating members and said insulating members from the frame structure of the condensers by means of clamps.

The many objects of this invention which are successfully secured thereby will become apparent from the following detailed description of several forms of the invention in connection with the attached drawings.

This invention resides substantially in the combination, construction, arrangement and relative location of parts, all as will be described in detail below.

In the accompanying drawings—

Figure 1 is a cross-sectional view taken on the line 1—1 of Figure 2;

Figure 2 is a side elevational view of a condenser construction in accordance with this invention;

Figure 3 is a cross-sectional view taken on the line 3—3 of Figure 1;

Figure 4 is a plan view of one of the supporting straps by means of which the insulator is supported from the framework of the condenser;

Figure 5 is a plane view of the supporting strap by means of which the stator plates are mounted on the insulator;

Figure 6 is a detailed view with some parts broken away and some parts in section of a modification wherein the insulator of the preceding figures is modified;

Figure 7 is a cross-sectional view similar to the view of Figure 1 with some parts broken away showing a further modification;

Figure 8 is an end elevational view thereof;

Figure 9 is a top plan view thereof;

Figure 10 is a plan view of the insulator supporting strap; and

Figure 11 is a plan view of the stator supporting strap.

At the present time the stator plates of variable condensers of either the single or "gang" type are supported on and insulated from the main framework of the condenser which is metallic, by means of thin plates of insulating material, such as, for example "Bakelite". As those skilled in the art know, these plates are interposed between the frame of the condenser and the fixed plates and are attached to the respective parts by means of rivets. Furthermore, thin plates of insulating material of this type have a tendency to warp, thereby throwing the plates out of alignment, which of course is a serious difficulty since the modern condenser, especially of the variable air type, is constructed with but very little separation between the fixed and movable plates. There are more suitable materials, such as ceramics, certain types of glass and other pressed or moulded materials, for use in insulating and supporting the stator plates from the frame structure of variable condensers because of their superior insulating properties at high frequencies and greater mechanical stability, with changes in temperature and humidity. Some attempts have been made to use these materials to insulate and support the stator plates from the frame of variable condensers—but these attempts as far as I have been aware, have not been successful because of the fragile and brittle properties of these materials and the means devised to support such materials which resulted in considerable loss due to breakage in manufacture and later in use.

The general purpose of this invention is to provide an improved form of supporting structure by means of which brittle and fragile insulating bodies of this type may be employed for the purpose and in a manner so that the breakage in manufacture and later use is practically nil.

By means of the construction disclosed below ceramic insulators are incorporated therein in a manner so that they seldom break during the process of mounting them in place. The result is that a large source of rejects, as encountered when brittle or fragile insulating plates are attached by riveting, is eliminated by this invention.

A common form of variable condenser construction is illustrated in Figures 1 to 3, inclusive, and is adapted to either a single or "gang" condenser construction. For sake of simplicity, a single condenser unit is illustrated. It is shown as comprising a pair of metal end plates 1 and 2 which are joined together in spaced parallel relation by means of the cross-bars 3 and 4 which are set in the notches in the end plates and held therein by beading the metal over at the end of the receiving slots in accordance with common practice in the art. The structure is further braced by cross-rods 5 and 6 which are peripherally grooved near the ends and forced into slots in the end plates and held there by friction. At 7 is the rotor plate shaft which is journalled in the end plates at one end in ball bearings, as indicated at 8, and at the other end by means of an adjustable ball thrust bearing and lock nut 9, all in accordance with common practice. The rotor plates 11 are attached to the shaft 7 in any suitable manner so as to lie parallel to each other with the desired spacing. As is commonly employed, a friction contact spring 10 is mounted on the end plate 2 and engages the shaft 7 to provide a connection to the rotor plates. These rotor plates are further braced and held in proper spaced relation by means of a strip of metal 11a which is riveted thereto along the edges by rolling over the tips 11b formed on the plates.

The stator plates 12 are arranged in parallel spaced relation and held therein by means of the metal straps 13 which are riveted thereto by means of the tips 14 and 15 which are formed on the plates, project through apertures in the straps, and are beaded over in accordance with common practice. A pair of these straps is usually employed at opposite sides of the stator plates, as shown in Figure 1. All of this construction is common at the present time in the manufacture of variable condensers.

The most usual way of supporting this stator plate unit from the framework comprises riveting suitably shaped Bakelite or other molded insulating plates to the crossbraces 3 and 4 and riveting metal plates thereto with tabs which may be soldered to the straps 13.

The present invention is concerned with a modified construction by means of which, as noted above, insulators may be employed for supporting and insulating the stator plates from the frame. In Figure 5 there is shown a metal strap 16 which is substantially rectangular in shape and having a pair of tabs or ears 16a and 16b integral with one end and a similar tab 16c integral with the other end. The center of the rectangular portion is cut out to leave a connector tab 17. A second strap, which is illustrated as being of substantially rectangular form, is shown at 19 having a large rectangular central opening as shown. At 22 is a tube or rod of insulating material, such as ceramic, about which the strap 19 is wrapped, as is clear from the drawings, and riveted by the rivets 20 so as to tightly bind the ceramic body at the encircled portions. The overlying ends of the strap are then riveted to the cross-brace 3 by means of the rivets 21, as is clear particularly from Figure 1. This firmly supports the body 22 on the frame. The strap 16 is wrapped around the body 22 as is clear from Figure 2, and the portions 16d thereof which overlie are riveted together by means of the rivets 18. This strap is thus tightly bound to the ceramic body so that there is no relative longitudinal movement therebetween. In wrapping the strap into this form the tab 16c moves over in the plane of and between the tabs 16a and 16b as is clear particularly in Figure 3. These tabs are then all soldered to the strap 13 on the stator. At the same time the connector lug 17 projects outwardly to provide a ready means for soldering wire connections thereto to complete the circuit to the stator. The construction at each side of the stator is the same and it becomes apparent that the stator is supported on the rods or tubes 22 and thereby insulated from the condenser frame. The straps 16 and 19 bind the rod sufficiently tight so that they cannot move longitudinally with respect to each other. A solid body of this type is well able to stand the stresses and strains resulting from the tight wrapping of the metal and the riveting of the parts together.

In the modification of Figure 6 the insulating rod, which in this case is shown at 23, is circumferentially grooved or molded with circumferential grooves as indicated at 23a so that the encircling portions of the straps 16 and 19 lie in these grooves as is clear from this figure. While this provides a more expensive construction it further ensures against relative longitudinal movement between the parts. It will be apparent to those skilled in the art that various modifications will be suggested by this arrangement for producing similar results.

A still further modification is shown in Figures 7 to 11, inclusive, and is provided in one sense to illustrate the fact that the straps may take many and varied forms. In this arrangement the insulating body 33, which although shown as a thick wall tube may be a solid rod or bar of any desired shape, has its longitudinal axis extending at right angles to the direction of the axis of the body 33 in the previously described arrangements. In this case the strap 30 is substantially U-shaped in that it has a pair of integrally extending ears 30a and a connector lug 31 extending in the opposite direction at one end of the strap. This strap is folded around the body 33 as is clear from the figures so that a portion thereof contacts at the region where the rivet 32 clamps them together snugly binding the ceramic rod 33. The ears 30a are then bent out at right angles, as is clear from the figures, and soldered to the strap 13 as before. The strap 34 which is a substantially straight band is wrapped around the other end of the rod 33 and riveted as indicated at 36. The ends 34a are then bent outwardly along inclined dotted lines and again slightly bent outwardly so as to lie against the cross-bar 3 as is clear particularly in Figures 8 and 9. These ends are then fastened to the cross-bar by the rivets 35. Here again the stator is supported on the frame by the ceramic bars 33 at each side thereof and by them insulated from the frame. The connector lug 31 extends outwardly to one side of the strap 34 as is particularly clear from Figure 9.

It is, of course, apparent to those skilled in the art that the trimming condensers frequently used in connection with devices of this type may be employed and may also be supported from the insulator of this invention and in conjunction with the clamping supports therefor.

From the above description many modifications of the basic idea of this invention will be apparent to those skilled in the art in view of this disclosure. I do not, therefore, desire to be strictly limited to the forms of invention employed for illustrating it, but rather to the scope of the claims which follow.

What I seek to secure by Letters Patent is:

1. A supporting structure for electrical apparatus comprising a ceramic member, a metal strap folded upon itself and encircling said member at two spaced points, means for clamping the strap to said member, and a second metal strap folded upon itself encircling said member at two spaced points and having means for clamping it thereto.

2. A supporting structure for electrical apparatus comprising a ceramic member, a metal strap folded upon itself and encircling said member at two spaced points, means for clamping the strap to said member, and a second metal strap folded upon itself encircling said member at two spaced points and having means for clamping it thereto, said second strap having a plurality of integral projecting lugs.

CHARLES F. MOLZEN.